(12) United States Patent
Kanehara et al.

(10) Patent No.: US 9,368,250 B2
(45) Date of Patent: Jun. 14, 2016

(54) NANOINK COMPOSITION

(75) Inventors: Masayuki Kanehara, Okayama (JP); Toshiharu Teranishi, Ibaraki (JP)

(73) Assignee: MASAYUKI KANEHARA, Okayama (JP)

( * ) Notice: Subject to any disclaimer, the term of this patent is extended or adjusted under 35 U.S.C. 154(b) by 93 days.

(21) Appl. No.: 13/634,565

(22) PCT Filed: Mar. 15, 2011

(86) PCT No.: PCT/JP2011/001509
§ 371 (c)(1),
(2), (4) Date: Sep. 13, 2012

(87) PCT Pub. No.: WO2011/114713
PCT Pub. Date: Sep. 22, 2011

(65) Prior Publication Data
US 2013/0001479 A1    Jan. 3, 2013

(30) Foreign Application Priority Data

Mar. 15, 2010 (JP) ................................. 2010-056840

(51) Int. Cl.
*H01B 1/02* (2006.01)
*H01B 1/22* (2006.01)
*C09D 7/12* (2006.01)
*C09D 11/52* (2014.01)
(Continued)

(52) U.S. Cl.
CPC ................ *H01B 1/22* (2013.01); *C09D 7/1225* (2013.01); *C09D 11/52* (2013.01); *C08K 3/22* (2013.01); *C08K 9/04* (2013.01); *H01B 1/02* (2013.01)

(58) Field of Classification Search
CPC .... B82Y 30/00; Y02E 10/549; C07D 487/04; A61K 41/0071; A61L 15/56; H01B 1/02
USPC ........................................ 252/512, 514, 519.3
See application file for complete search history.

(56) References Cited

U.S. PATENT DOCUMENTS 6,902,815 B2    6/2005    Kashiwabara et al.
7,981,326 B2    7/2011    Sato et al.
(Continued)

FOREIGN PATENT DOCUMENTS

JP    01-104679 A    4/1989
JP    2010090264 A    4/2010
(Continued)

OTHER PUBLICATIONS

International Search Report for PCT/JP2011/001509 mailed May 17, 2011 (2 pages).
Kanehara et al., 2008, "Gold(0) Porphyrins on Gold Nanoparticles," Angew. Chem. Int. Ed., 47:307-310.
(Continued)

*Primary Examiner* — Harold Pyon
*Assistant Examiner* — William Young
(74) *Attorney, Agent, or Firm* — Sutherland Asbill & Brennan LLP

(57) ABSTRACT

Disclosed is a nanoink composition which can impart electrical conductivity to a surface-protecting ligand layer of an inorganic nanoparticle and does not require any post-treatment such as the removal of ligands. Specifically disclosed is a nanoink composition comprising inorganic nanoparticles (1) and an organic Π-conjugated ligand (3), and characterized in that the organic Π-conjugated ligand (3) is bound to the inorganic nanoparticles (1) via Π-conjugation to exhibit electrical conductivity.

6 Claims, 15 Drawing Sheets

(51) Int. Cl.
  *C08K 3/22* (2006.01)
  *C08K 9/04* (2006.01)

(56) References Cited

U.S. PATENT DOCUMENTS

| | | | |
|---|---|---|---|
| 2003/0118729 A1* | 6/2003 | Bishop et al. | 427/256 |
| 2004/0135127 A1 | 7/2004 | Kashiwabara et al. | |
| 2005/0058713 A1* | 3/2005 | Russell et al. | 424/489 |
| 2006/0180199 A1 | 8/2006 | Lenhard et al. | |
| 2006/0284169 A1 | 12/2006 | Park et al. | |
| 2008/0072960 A1* | 3/2008 | Kim et al. | 136/263 |
| 2009/0274834 A1 | 11/2009 | Chopra et al. | |
| 2010/0084637 A1 | 4/2010 | Choi et al. | |

FOREIGN PATENT DOCUMENTS

| | | |
|---|---|---|
| TW | 200837175 A | 9/2006 |
| WO | 2002/099819 A1 | 5/2002 |
| WO | 2008/100084 A1 | 8/2008 |
| WO | 2012/042264 A2 | 4/2012 |

OTHER PUBLICATIONS

Itako et al., 2009, "Synthesis and Optical Properties of Gold Nanoparticles Protected by Phthalocyanine Derivatives," CSJ: The Chemical Society of Japan Koen Yokoshu, vol. 89, No. 1, p. 179, 3 D2-13.

Gursoy et al., 2001, "Synthesis of New Metal-Free and Metal-Containing Phthalocyanines with Tertiaryor Quaternary Aminoethyl Substituents," Monatshefte fur Chemie, vol. 132, pp. 813-819.

Law et al., 2008, "Structural, Optical, and Electrical Properties of PbSe Nanocrystal Solids Treated Thermally or with Simple Amines," J. Am. Chem. Soc., 130:5974-5985.

Supplementary European Search Report for Application No. EP 11755904.7 completed May 20, 2014.

English translation and Chinese Office Action for Application No. CN 2011800141979 dated Oct. 29, 2014.

English translation and Chinese Search Report for Application No. CN 2011800141979.

Japanese Office Action (including partial English translation) of Japanese Application No. 2012-505509 dated May 26, 2015.

English translation and Chinese Office Action for Application No. CN 2011800141979 dated May 19, 2015.

* cited by examiner

OTAP

OTAN

NANOINK COMPOSITION

CROSS REFERENCE TO RELATED APPLICATIONS

This application claims the priority benefit of PCT/JP2011/001509 filed of Mar. 15, 2011 and Japanese Application No. 2010-056840 filed of Mar. 15, 2010. The contents of these applications are hereby incorporated by reference in their entirety.

TECHNICAL FIELD

The present invention relates to a nanoink composition.

BACKGROUND ART

An integrated electronic circuit as a typical semiconductor is improved in the function by increasing the integration density. Thus, a manufacturing method of forming a conductive circuit in a vacuum with the sputtering or the vapor deposition has been adopted. Since it is a premise that the process is conducted in the vacuum, an apparatus thereof is expensive and a huge investment is required to shift a next generation of higher integration density. An enormous energy is also required in order to keep the vacuum condition. Therefore, a conductive nanoink necessary for forming the conductive circuit in an ink-jet type at normal temperature and at normal pressure.

Inorganic nanoparticles have been widely utilized in a conductive nanoink (e.g., see Patent Reference 1 and the like). Organic ligands protecting surfaces of the inorganic nanoparticles are indispensable in order to keep the inorganic nanoparticles staying stably in the nanoink. Since the organic ligand is electrically insulating, a thin coating film obtained by applying and drying nanoink of a nanoparticle solution is also electrically insulating. Conventionally, it was necessary to remove ligands by the post-treatment with chemicals and by firing at high temperature in order to convert it from electrically insulative to conductive. In such processing, there was limitation in selection of a substrate (e.g., see Non-patent Reference 1 and the like).

On the other hand, the present inventors investigated organic ligands and gold particles and presented a paper that characteristic optical properties were expressed with pi junction (e.g., see Non-patent Reference 2 and the like).

PRIOR ART TECHNOLOGY

Patent Reference

Patent Reference 1: JP A 2009-295965

Non-Patent Reference

Non-Patent Reference 1: Matt, Law and five others, "Structural, Optical, and Electrical Properties of Pb Se Nano crystal Solids Treated Thermally or with Simple Amines," J. Am. Chem. Soc. 2008, 130 5974-5985.

Non-Patent Reference 2: Masayuki, Kanehar, and two others, "Gold(0) Prophyrins on Gold Nanoparticles," Angew. Chem. Int. Ed. 2008, 47, 307-309.

SUMMARY OF THE INVENTION

Problems to be Resolved by the Invention

In order to keep thermodynamically unstable inorganic nanoparticles staying in a stable condition for a long period of time, ligands are indispensable and organic ligands having long-chain alkyl groups such as decanethiol have been conventionally utilized. However, in a case where ligand layers are made of octanethiol with respect to these sigma-type ligands, nanoink has a value of resistance as large as several gigas of ohms just as applied. Therefore, with respect to the nanoink having such ligand layers, it was necessary to remove these ligand layers of high resistance after application. It has been assumed that it is very difficult to realize a nanoink composition in which electrical conductivity is imparted to surface-protecting ligand layers of inorganic nanoparticles such that the post-treatment such as removal of ligands is not necessary (see (1) Talapin, D. V; Murray, C. B. Science 2005, 310, 86-89 (page 8) or (2) Law, M. Luther, J. M. Song, Q. Hughes, B. K.; Perkins, C. L.; Nozik, A. J. J. Am. Chem. Soc. 2008, 130, 5974-5985 (pages 5974 and 5975)).

It is an object of the present invention to provide a nanoink composition in which electrical conductivity is imparted to surface-protecting ligand layers of inorganic nanoparticles such that the post-treatment such as removal of ligands is not necessary.

Means of Solving the Problems

The present inventors intensively conducted the research and development in order to resolve the above problems. In particular, effects of strength of pi junction (n junction) and steric hindrance between particles on the electrical conductivity have been investigated. As a result, meaning that pi junction organic ligands are connected to metal nanoparticles with pi junction was found so as to complete the present invention.

(1) A nanoink composition comprising: an inorganic nanoparticle, an organic pi conjugated ligand, and a solvent, wherein the organic pi conjugated ligand is connected to the inorganic nanoparticle with pi-junction such that the nanoink composition becomes electrically conductive with strong pi-junction and access among particles.

The nanoink composition of the present invention as described in (1) has an electrical conductive property as the organic pi conjugated ligand is connected to the inorganic nanoparticle with pi junction. Here, the pi junction is that pi conjugate plane of pi conjugated molecule is joined in parallel to a surface of the inorganic nanoparticle. And the organic pi conjugated ligand is an organic ligand to make such pi junction effective to the inorganic nanoparticle.

FIG. 1 is a diagram illustrating a concept of the nanoink composition according to the present invention. Conventionally, an inorganic nanoparticle 1 has to have a ligand in order to keep the thermally unstable inorganic nanoparticle in a stable condition for a long period of time as shown in FIG. 1(a) and conventionally an organic ligand having a long alkyl group such as decanethiol and the like is mainly used. However, these sigma type ligands 2 have a long insulating organic structural portion such that a ligand layer has a large value of resistance and the value of resistance was about several gigas of ohm ($\Omega$) in the case where the sigma type ligand is octanethiol.

In the nanoink composition according to the present invention, as shown in FIG. 1(b), the organic pi conjugated ligand 3 is connected with pi junction. With respect to the organic pi conjugated ligand 3 as shown in FIG. 1(b), the ligand layer is thin and pi orbital is positioned in an advantageous direction for the electrical conductance between particles such that the resistance of the ligand layer is relatively low and an electrical conductive property is expressed at the organic pi conjugated ligand 3 due to mutual interaction of orbital of the inorganic nanoparticle by the pi junction. Therefore, the nanoink composition according to the present invention has the electrical conductive property.

The pi junction is a strong mutual interaction between the organic pi orbital—the inorganic nanoparticle orbital created by bringing the organic pi orbital close to the surface of the inorganic nanoparticle. The strength of the pi junction can be quantitatively evaluated by the ultraviolet-visible light spectral measurement. Porphyrin and phthalocyanine have characteristic absorbance as referred to as soret band and Q band in the visible light range. When the strong pi junction is expressed, the organic pi orbital is metalized by the strong mutual interaction between the organic and the inorganic such that the above characteristic absorbance becomes significantly broadened. In order to obtain the conductive nanoparticle, the strong pi junction and approach of particles are necessary.

(2) The nanoink composition as described in (1), wherein the organic pi conjugated ligand is an organic pi conjugated ligand which has one or more of substituent groups of amino group, mercapto group, hydroxyl group, carboxyl group, phosphine group, phosphonate group, halogen group, selenol group, sulfide group, and seleno ether group, the one or more of substituent groups coordinating to a surface of the inorganic nanoparticle.

(3) The nanoink composition as described in (1), wherein the organic pi conjugated ligand is an organic pi conjugated ligand which has one or more of substituent groups of hydroxyl group, carboxyl group, amino group, alkylamino group, amido group, phosphonate group, sulfonate group, cyano group, nitro group, and salt thereof, the one or more of substituent groups enabling the inorganic nanoparticle being soluble to a solvent containing water and an alcohol solvent.

(4) The nanoink composition as described in any one of (1) to (3), wherein the solvent is water or a solvent mixed with water, or alcohol or a solvent mixed with alcohol.

Since water, a solvent mixed with water, or alcohol or a solvent mixed with alcohol are low in the cost and easy to handle. Here, the constituent other than water can be alcohol, ether, ketone, amido, etc. and it is preferable to be alcohol and the like, more preferable to be alcohol and the like having on to 10 carbons. More specifically, as a solvent of alcohol system, methanol, ethanol, n-propanol, isopropanol, n-butanol, isobutanol, 2-butanol, tert-butanol, 1-pentanol, 2-methyl-1-butanol, isoamyl alcohol, hexyl alcohol, heptyl alcohol, octyl alcohol, capryl alcohol, nonyl alcohol, decyl alcohol, undecyl alcohol, lauryl alcohol, allyl alcohol, crotyl alcohol, propargyl alcohol, cyclopentanol, cyclohexanol, 2-methoxyethanol, 2-ethoxyethanol, 2-butoxyethanol, ethylene glycol, propylene glycol ye, etc. can be cited. Among these solvents, as particularly preferable solvent, methanol, ethanol, 2-ethoxyethanol, ethylene glycol, and propylene glycol can be used.

(5) The nanoink composition as described in any one of (1) to (3), wherein the inorganic nanoparticle is made of one metal, a mixture of two or more metals, or an alloy with two or more metals of gold, silver, copper, platinum, palladium, nickel, ruthenium, indium, and rhodium.

(6) The nanoink composition as described in any one of (1) to (3), wherein the inorganic nanoparticle is either semiconductor particle or electro-conductive oxide particle.

In the nanoink composition according to the present invention as described in (6), as the inorganic nanoparticle, a semiconductor particle or an electrical conductive oxide particle is used. The semiconductor particle and the electrical conductive oxide particle comprises what exhibits special properties of various kinds and it is possible to expect new applications by protecting such special properties by the organic pi conjugated ligand.

(7) The nanoink composition as describe in (1), wherein the organic pi conjugated ligand is OTAP.

Here, OTAP is academically called as "2,3,9,10,16,17,23,24-octakis[(2-N,N-dimethylamino ethyl)thio]phthalocyanine" (hereinafter referred to as "OTAP") and is an organic pi conjugated ligand having a chemical structure as shown in FIG. 3.

(8) The nanoink composition as describe in (1), wherein the organic pi conjugated ligand is OTAN.

Here, OTAN is called as "2,3,11,12,20,21,29,30-octakis [(2-N,N-dimethylamino ethyl)thio]naphthalocyanine (hereinafter referred to as "OTAN") and is an organic pi conjugated ligand having a chemical structure as shown in FIG. 6.

(9) A manufacturing method of a nanoink composition comprising the steps of: a gold nanoparticle production step in which an aqueous solution of chlorauric acid is boiled and trisodium citrate is quickly added thereto as being stirred vigorously and a mixture thereof is boiled such that a citrate protecting gold nanoparticle solution is produced; and a step in which OTAP formate is added to the citrate protecting gold nanoparticle solution such that phthalocyanine 3 protecting gold nanoparticle is produced.

According to the manufacturing method of the nanoink composition of the present invention as described in (7), the gold nanoink composition of the present invention can be manufactured.

(10) A manufacturing method of a nanoink composition comprising the steps of: a gold nanoparticle production step in which an aqueous solution of chlorauric acid is boiled and trisodium citrate is added thereto as being stirred vigorously and a mixture thereof is boiled such that a citrate protecting gold nanoparticle solution is produced; and a step in which OTAN formate is added to the citrate protecting gold nanoparticle solution such that phthalocyanine 3 protecting gold nanoparticle is produced.

According to the manufacturing method of the nanoink composition of the present invention as described in (10), the gold nanoink composition of the present invention can be manufactured.

Effects of the Invention

According to the present invention, it is possible to provide a nanoink composition and a manufacturing method thereof wherein the nanoink composition does not require the post-treatment to remove ligands as the simply applied and dried nanoink composition at normal temperature and in normal pressure has an electrical conductive property while the surface protecting ligand layer, which is conventionally an electrically insulating layer, becomes imparted with electrically conductive properties.

MODE FOR CARRYING OUT THE INVENTION

Figure 2:
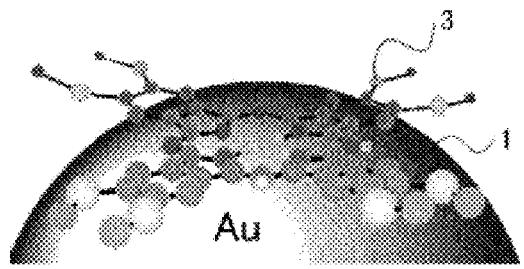
FIG. 2 is a diagram illustrating a concept of a nanoink composition having a pi junction organic ligand according to the present invention.

In the following, an embodiment of the present invention will be explained with reference to the drawings. Here, this is explained as an example and the technical scope of the present invention is not limited to this.
(Embodiment 1)
Embodiment 1 is an example in which gold was used for inorganic particles and OTAP was used for pi junction organic ligands.
(Embodiment 1)
FIG. 2 is a diagram illustrating a concept of a nanoink composition according to the present invention. As shown in FIG. 2, an inorganic particle 1 is made of gold and a pi junction organic ligand 3 is made of OTAP. As shown in FIG. 2, the pi junction organic ligand 3 of OTAP strongly adheres to the inorganic particle 1 of gold.

Figure 1:
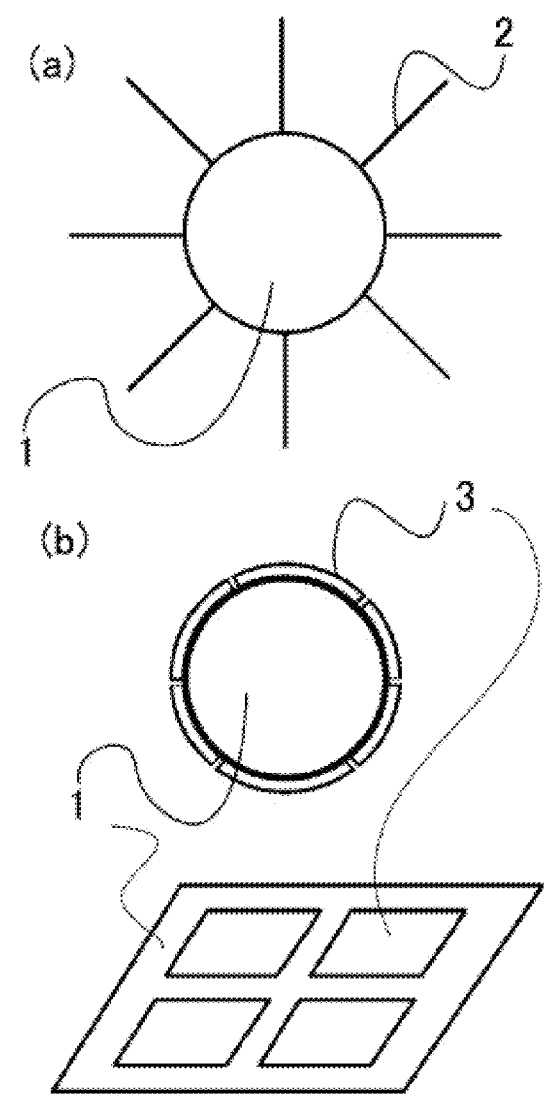
FIG. 1 is a diagram illustrating a concept of a nanoink composition according to the present invention.
Figure 3:
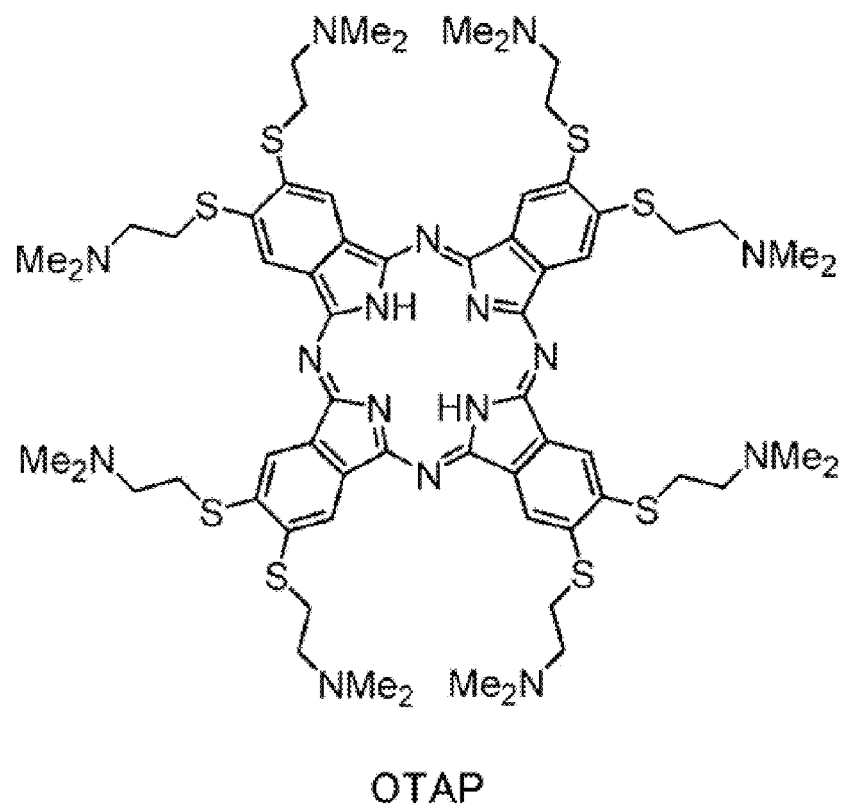
FIG. 3 is a chemical structure diagram of OTAP as a pi junction organic ligand utilized in a nanoink composition according to the present invention.
Figure 4:
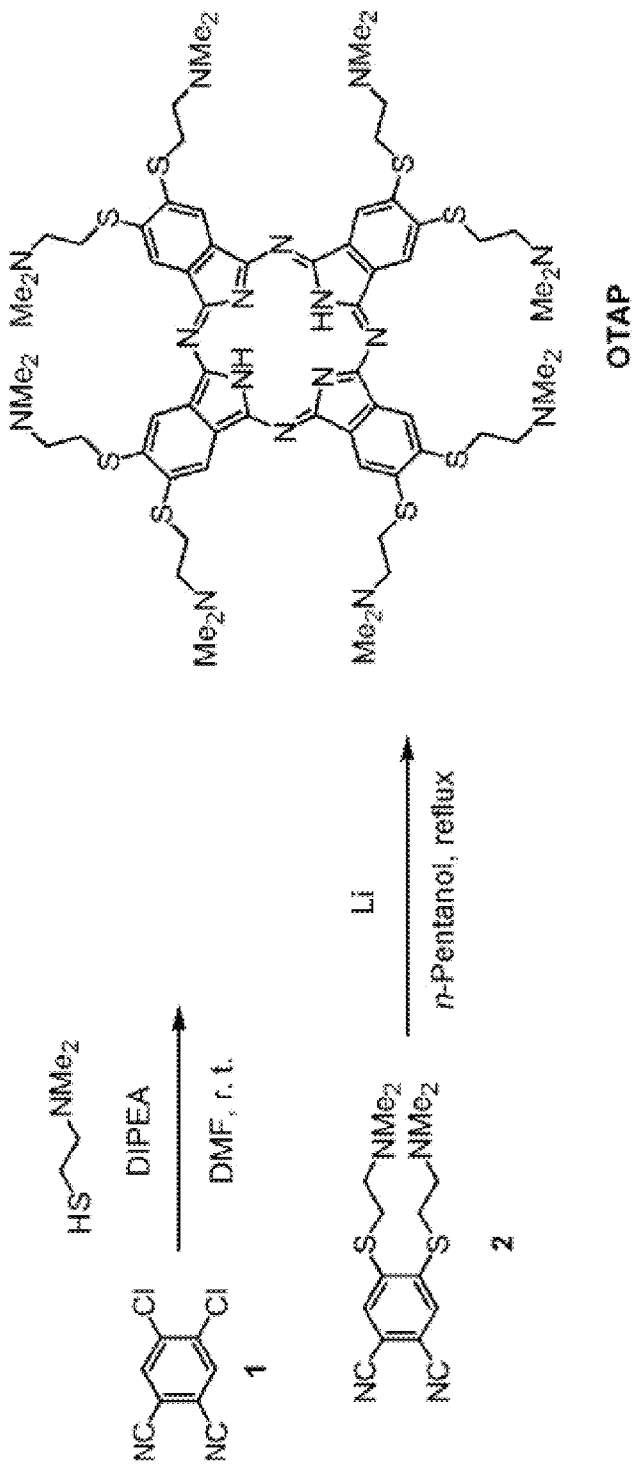
FIG. 4 is a diagram illustrating manufacturing processes of OTAP as a pi junction organic ligand utilized in a nanoink composition according to the present invention.

In reference to FIG. 3, a manufacturing method of manufacturing a nanoink composition utilizing OTAP according to the present invention.
(Manufacturing Method of OTAP Organic Pi-Conjugated Ligand)
As shown in FIG. 4, synthesis of 4,5-bis[(2-N,N-dimethylaminoethyl)thio]phthalonitrile (FIG. 4-2) was conducted by dissolving 4,5-dichlorophthalonitrile (FIG. 4-1, 5.0 g, 25 mmoL) and N,N-dimethylaminoetanethiol hydrorochloride (9.0 g, 64 mmoL) with dehydrated DMF (100 mL), dripping dehydrated diisopropylethylamine (14 mL, 80 mmoL) thereinto, and stirring them at room temperature for four hours. After 200 mL of water was added to the solution and organic material was precipitated, the mixture solution was filtrated and then purified with column chromatography alumina (dichloromethane/ethyl acetate=2/1) such that 4,5-bis[(2-N,N-dimethylaminoethyl)thio]phthalonitrile (FIG. 4-2, 23.0 g, 29% was obtained.

Synthesis of (2,3,9,10,16,17,23,24-octakis[(2-N,N-dimethylaminoethyl)thio]phthalocyanine, OTAP) was conducted by adding 4,5-bis[(2-N,N-dimethylaminoethyl)thio]phthalonitrile (FIG. 4-2, 1.7 g, 5.0 mmoL) to a solution in which lithium (0.35 g, 50 mmoL) was dissolved with n-pentanol (30 mL) and conducting reflux thereof for 12 hours. The solvent was distilled away and the rest was washed with water and acetonitrile such that 2,3,9,10,16,17,23,24-octakis[(2-N,N-dimethylaminoethyl)thio]phthalocyanine (OTAP, 1.1 g, 65%) was obtained.
(Synthesis of OTAP Protecting Pi Junction Gold Nanoparticles)

An aqueous solution of chlorauric acid (1 mM, 2 L) was boiled and trisodium citrate (1M, 4 mL) was quickly added thereto as being stirred vigorously and the mixture was boiled for 30 minutes such that a citrate protecting gold nanoparticle solution was obtained. OTAP formate (20 mg) was added thereto and the mixture was stirred for 30 minutes. The mixture was purified with water and ethanol and was dissolved with pure water such that an OTAP protecting pi junction gold nanoparticle solution was obtained. A methanol solution containing 50% of OTAP protecting pi junction gold nanoparticles was obtained by dissolving the mixture with a water/methanol=1/1 solvent.

Figure 5:
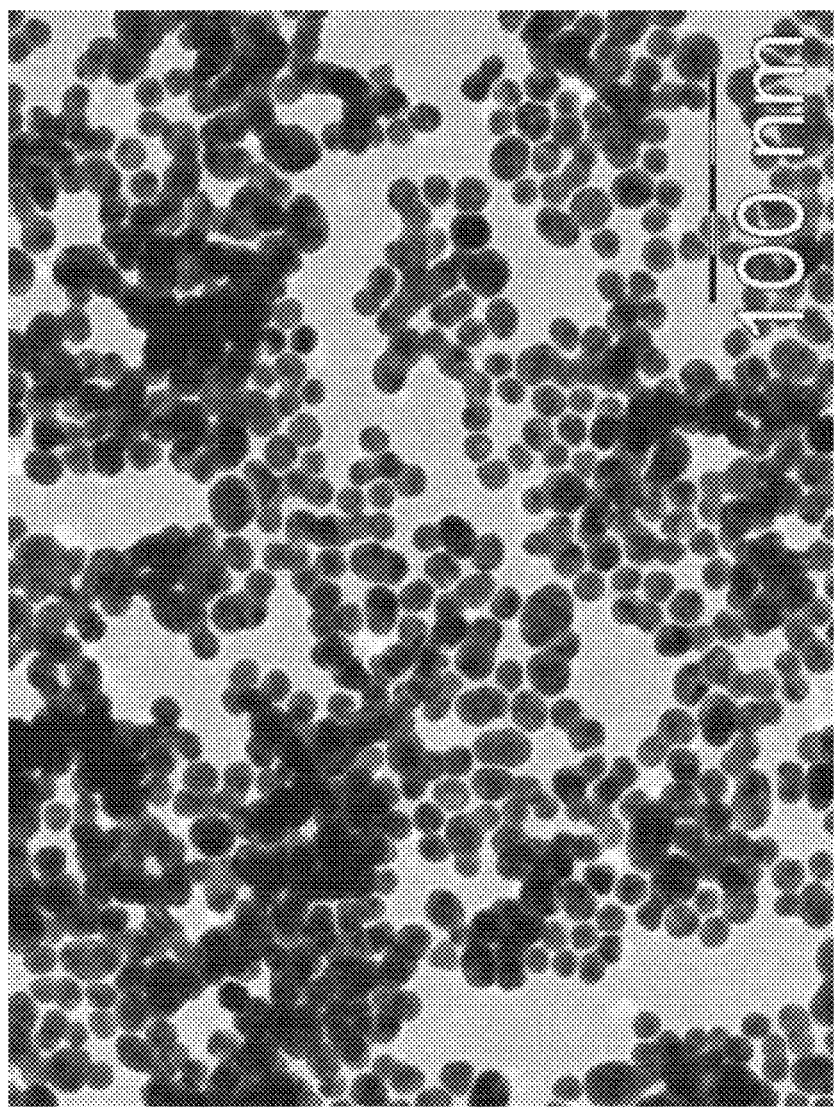
FIG. 5 is a transmission electron microscope image of an OTAP protecting gold nanoparticle nanoink composition according to the present invention.
Figure 6:
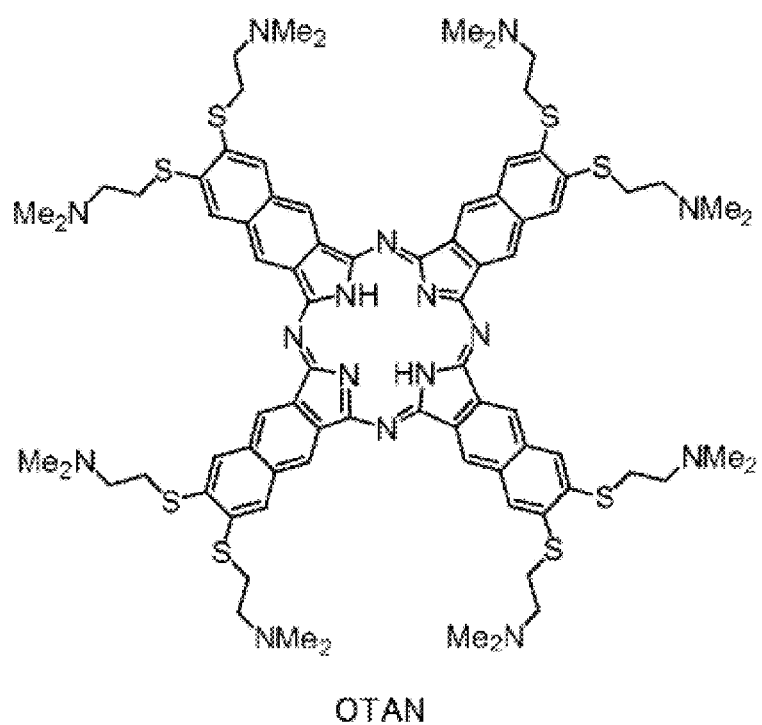
FIG. 6 is a chemical structure diagram of pi junction organic ligand OTAN of another embodiment according to the present invention.

A transmission electron microscope image of a nanoink composition, which was manufactured as described above, in an applied condition is shown in FIG. 5. As shown in FIG. 5, nanoparticles are dispersed such that it was found that the nanoink composition was able to be reduced into practice.

Further, the value of resistance between sections 1 cm apart as in an applied and dried condition at normal temperature was 0.4 Ω. The measurement was conducted with Tester KU-1188 manufactured by KAISE CORPORATION. Here, the thickness of the film measured was 1 μm.

A thin film of nanoparticles having a uniform thickness with width of 1 mm and length of 2 cm was manufactured with an OTAP protecting gold nanoparticle solution. The thin film was subject to a mild heat treatment at 55° C. for 30 minutes in order to evaporate remaining water molecules completely after it was dried at room temperature. And the electrical conductivity of this thin film was evaluated by the four-terminal method (IEC60093, JISK6911) and the electrical conductivity of this OTAP protecting gold nanoparticle was 1560 S/cm. Therefore, it was found to be electrically conductive and of practical use.

Figure 8:
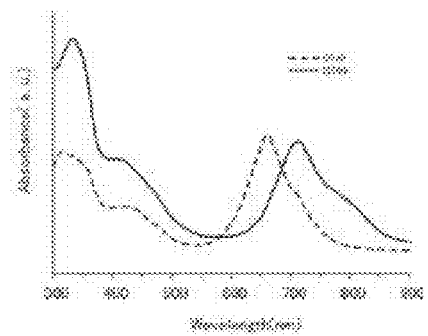
FIG. 8 shows UV-vis spectra of OTAP and OTAN.
Figure 9:
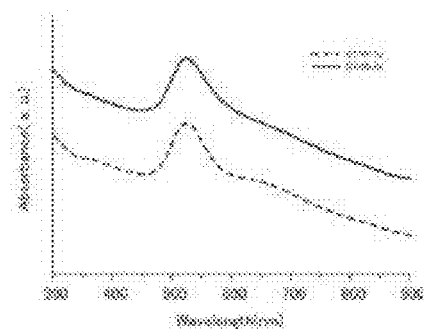
FIG. 9 shows UV-vis spectra of OTAP and OTAN protecting gold nanoparticles.
Figure 10:
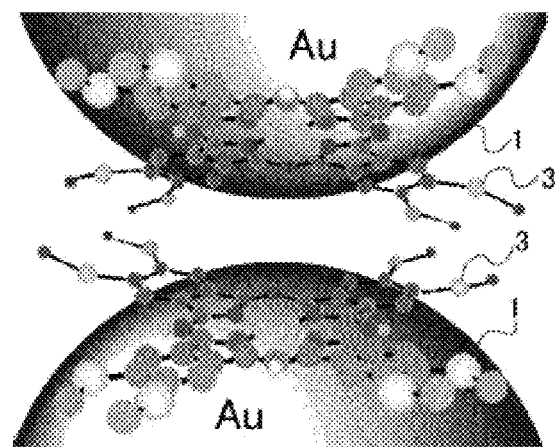
FIG. 10 is a diagram illustrating a concept of a nanoink composition having pi junction organic ligands according to the present invention.

With respect to OTAP and OTAN protecting gold nanoparticles, Q bands (see FIG. 8) near 650 and 700 nm having been observed when they were just ligands by themselves almost disappeared (see FIG. 9). This indicates existence of a strong pi junction. Since OTAN and OTAP have eight side chains substituted at beta positions, as conceptually shown in FIG. 10, the side chains do not rise up outward even when the nanoparticles are coordinated to such that particles can get sufficiently close enough. Therefore, the electrical conductivity is expressed.
(Embodiment 2)
In Embodiment 2, the organic pi conjugated ligand is made of OTAN and the inorganic nanoparticle is made of gold.

(Manufacturing Method of OTAN Organic Pi Conjugated Ligand)

Figure 7:
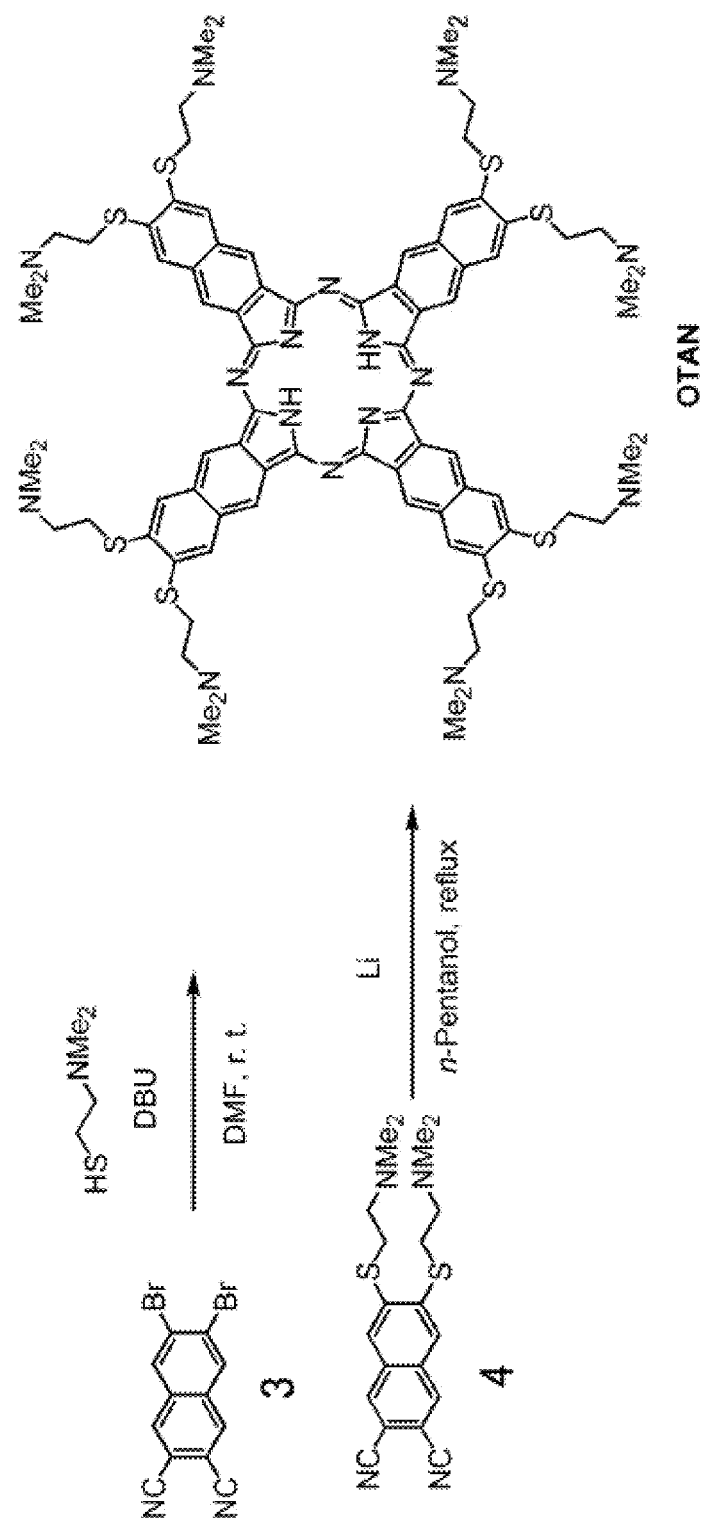
FIG. 7 is a diagram illustrating a manufacturing method of pi junction organic ligand OTAN utilized in a nanoink composition according to the present invention.

As shown in FIG. 7, synthesis of 2,3-dicyano-6,7-bis[(2-N,N-dimethylaminoethyl)thio]naphthalene (FIG. 7-4) was conducted by dissolving (2,3-Dibromo-6,7-dicyanonaphthalene) (FIG. 7-3, 2.54 g, 7.56 mmol) and N,N-dimethylamino ethanethiol hydrochloride (3.21 g, 22.7 mmol) with dehydrated DMF (30 mL), dripping 1,8-diazabicyclo[5.4.0]undec-7-ene (6.78 mL, 45.4 mmol) into the solution, and stirring the mixture at room temperature for one hour. Water of 30 mL was added to the solution and organic material was precipitated such that 2,3-dicyano-6,7-bis[(2-N,N-dimethylamino ethyl)thio]naphthalene (FIG. 7-4, 2.50 g, 88%) was obtained.

Synthesis of (2,3,11,12,20,21,29,30-octakis[(2-N,N-dimethylaminoethyl)thio]naphthalocyanine, OTAN) was conducted, as shown in FIG. 7, by adding 2,3-dicyano-6,7-bis[(2-N,N-dimethylamino ethyl)thio]naphthalene (FIG. 7-4, 816 mg, 2.12 mmol) to n-pentanol (30 mL) in which lithium (147 mg, 21.2 mmol) was dissolved, and conducting reflux for two hours. Solvent was distilled away and the rest was washed with water and acetonitrile such that 2,3,11,12,20,21,29,30-octakis [(2-N,N-dimethylamino ethyl)thio]naphthalocyanine, (OTAN, 377 mg, 46%) was obtained.

(Manufacturing Method of OTAN Protecting Pi Junction Gold Nanoparticles)

An aqueous solution of chlorauric acid (1 mM, 2 L) was boiled and trisodium citrate (1M, 4 mL) was quickly added thereto as being stirred vigorously and the mixture was boiled for 30 minutes such that a citrate protecting gold nanoparticle solution was obtained. OTAN formate (20 mg) was added thereto and the mixture was stirred for 30 minutes. The mixture was purified with water and ethanol and was dissolved with pure water such that an OTAN protecting pi junction gold nanoparticle solution was obtained.

As explained above, the nanoink composition was manufactured and applied onto a glass substrate in the same way as with Embodiment 1 such that the value of resistance was measured to obtain a value of resistance such that the value of resistance between sections 1 cm apart was 0.5 Ω at normal temperature as being applied and dried. Here, the thickness of the film measured was 1 μm.

A thin film of nanoparticles having a uniform thickness with width of 1 mm and length of 2 cm was manufactured with an OTAN protecting gold nanoparticle solution. The thin film was subject to a mild heat treatment at 55° C. for 30 minutes in order to evaporate remaining water molecules completely after it was dried at room temperature. The electrical conductivity of this thin film was evaluated by the four-terminal method (IEC60093, JISK6911) and the electrical conductivity of this OTAP protecting gold nanoparticle was 5370 S/cm.

(Embodiment 3)

Embodiment 3 relates to OTAP protecting pi junction palladium-core-gold-shell nanoparticles.

(Manufacturing Method of OTAP Protecting Pi Junction Palladium-core-gold-shell Nanoparticles)

Aqueous solutions (200 mL) of palladium (II) sodium chloride (0.4 mmol) and lithium citrate (1 mmol) were stirred vigorously in an ice water bath as an aqueous solution of sodium borohydride (200 mM, 1 mL) was quickly added thereto, and the mixture was stirred for five minutes such that palladium nanoparticles were obtained. An aqueous solution of sodium disulfitoaurate (I) (500 mM, 0.1 mL) was added thereto and the temperature was raised up to 50° C. OTAP formate (20 mg) was added thereto and the mixture was stirred for 10 minutes. The mixture was purified with water and ethanol and dissolved with pure water such that an aqueous solution of OTAP protecting pi junction palladium-core-gold-shell nanoparticles was obtained.

Figure 11:
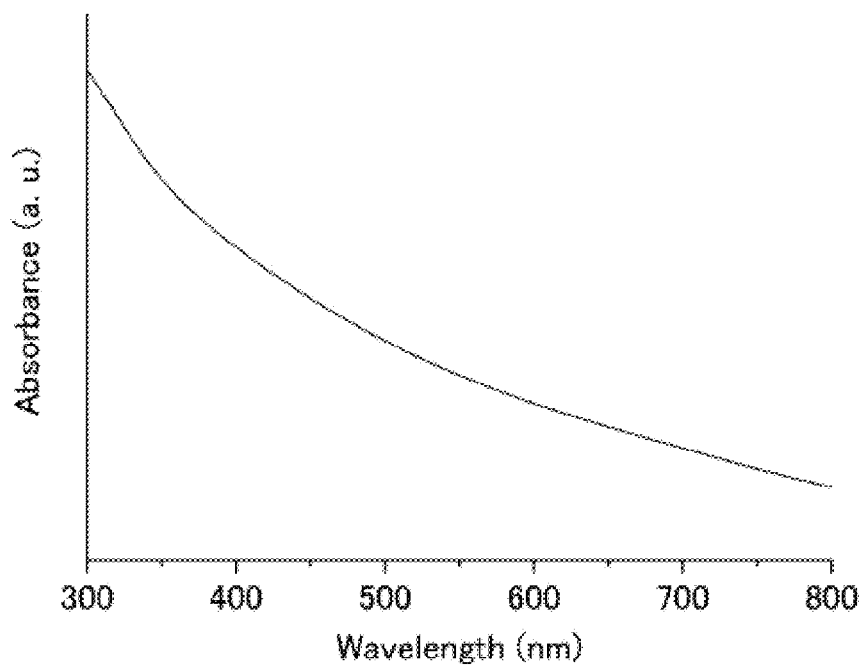
FIG. 11 shows UV-vis spectra of OTAP protecting palladium-core-gold-shell nanoparticles.

The result of UV-vis spectral measurement of OTAP protecting pi junction palladium-core-gold-shell nanoparticles synthesized as described above is shown in FIG. 11. As shown in FIG. 11, the soret band near 420 nm was broadened and so much broadening was recognized such that the Q band from 500 to 700 nm could not be observed, thereby expecting there was a strong pi junction.

As described above, the nanoink composition was manufactured and applied onto a glass substrate in the same way as with Embodiment 1 such that the value of resistance was measured to obtain a value of resistance such that the value of resistance between sections 1 cm apart was 100 Ω at normal temperature as being applied and dried. The thickness of the film measured was 1 μm. The value is similar to that of Embodiment 1 such that it has been found that it could be put in practical use.

(Embodiment 4)

Figure 12:
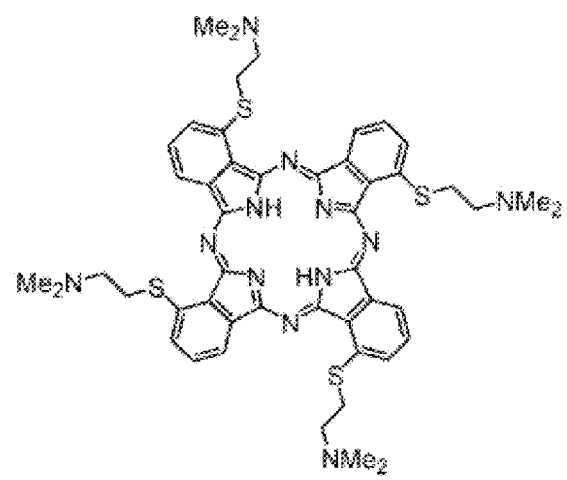
FIG. 12 is a chemical structure diagram of 1,8,15,22-tetrakis[(2-N,N-dimethylaminoethyl)thio]phthalocyanine of pi junction organic ligand of another embodiment according to the present invention.

In Embodiment 4, the organic pi conjugated ligand is made of 1,8,15,22-tetrakis[(2-N,N-dimethylaminoethyl)thio]phthalocyanine as shown in FIG. 12, and the inorganic nanoparticle is made of gold. In the same was as described with Embodiment 1, the nanoink composition was manufactured and applied onto a glass substrate such that the value of resistance was measured such that the value of resistance between sections 1 cm apart was $4 \times 10^3$ Ω at normal temperature as being applied and dried. Here, the thickness of the film measured was 1 μm. It has been found that it could be useful depending on the area of application.

It has been found that electrical conductivity is expressed in the case where various organic pi conjugated ligands and inorganic nanoparticles are made of gold or palladium-core-gold-shell as described above.

COMPARATIVE EXAMPLE 1

Figure 13:
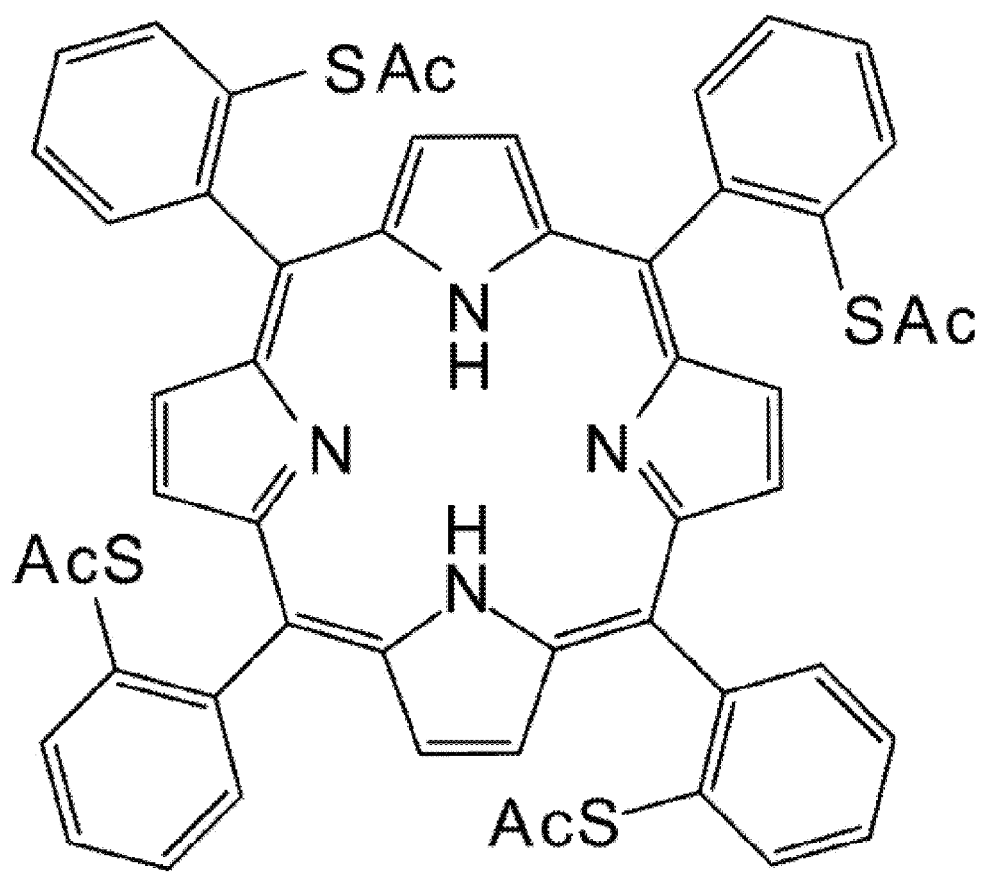
FIG. 13 is a chemical structure diagram of SC0P.
Figure 14:
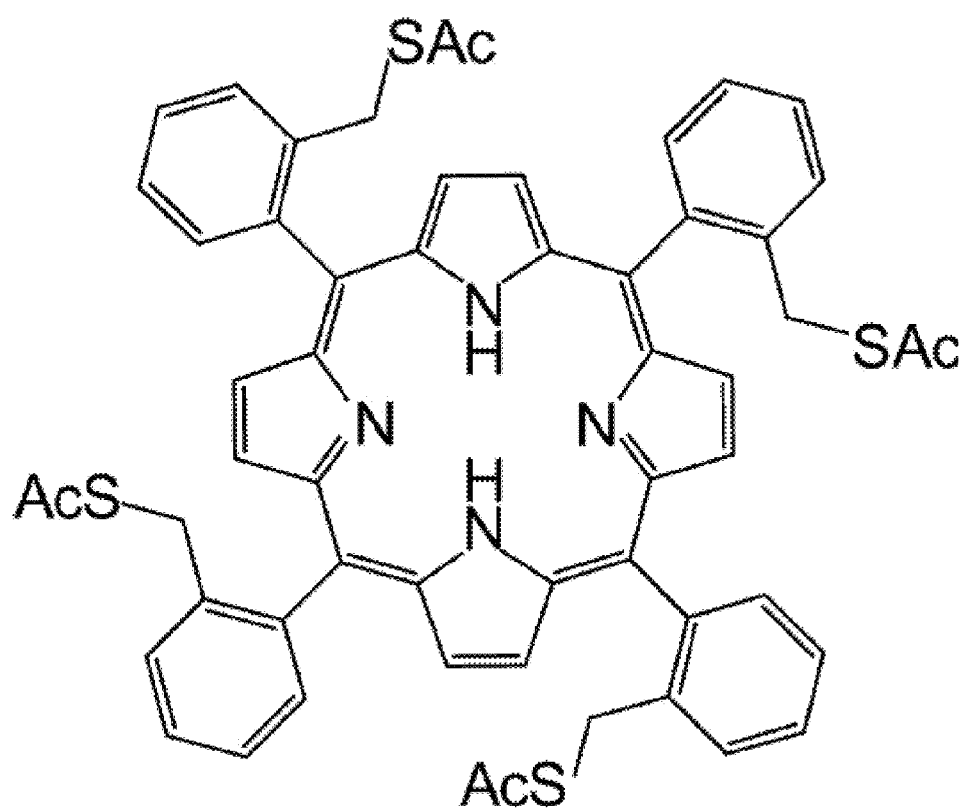
FIG. 14 is a chemical structure diagram of SC1P.
Figure 15:
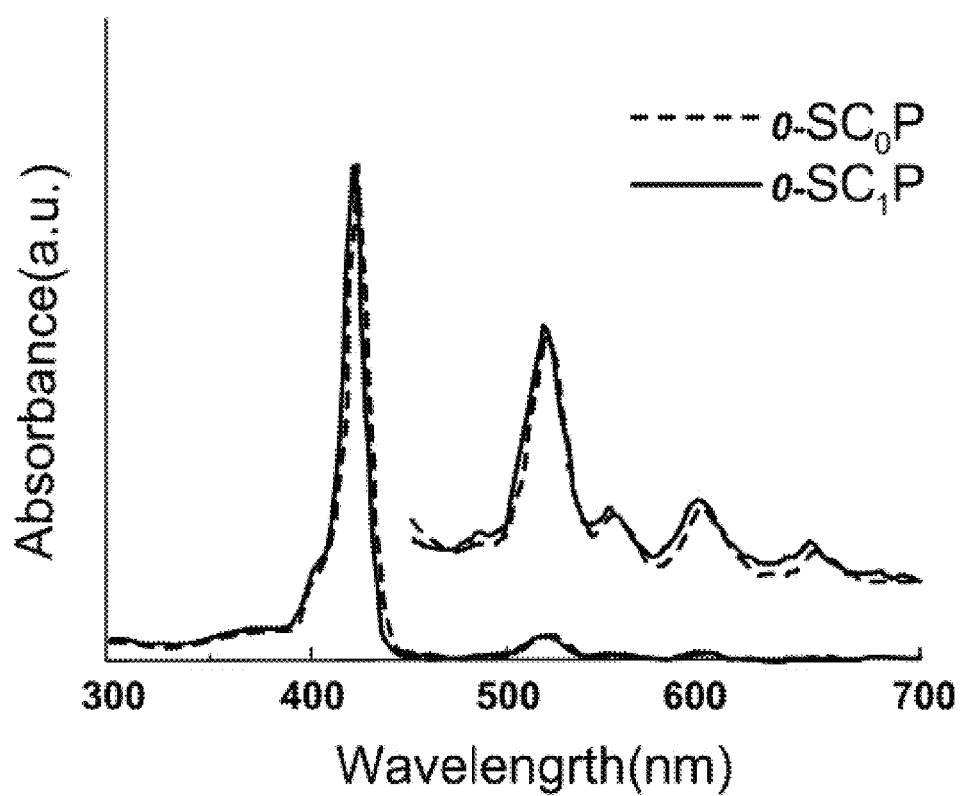
FIG. 15 shows UV-vis spectra of SCnP ligand (inserted diagram shows 10-times enlarged spectra in Q band).
Figure 16:
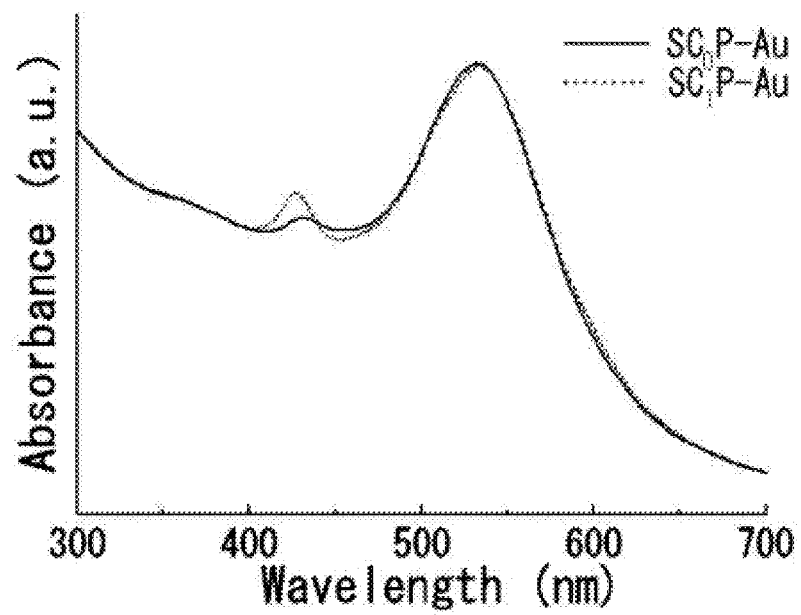
FIG. 16 shows UV-vis spectra of SCnP ligand protecting gold nanoparticles.
Figure 17:
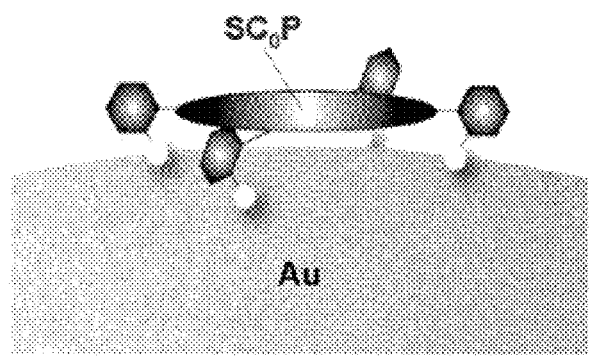
FIG. 17 is a model diagram of coordination structure of coordination on a gold nanoparticle of SC0P.
Figure 18:
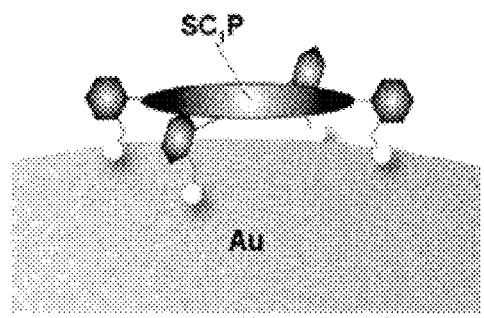
FIG. 18 is a model diagram of coordination structure of coordination on a gold nanoparticle of SC1P molecule.

With the gold nanoparticles having particle diameter of 10 nm and protected by pi junction porphyrin ligands SCnP of a chemical structure as shown in FIGS. 13 and 14, the soret bands near 420 nm were broadened, as shown in FIGS. 15 and 16, while the soret bands were observed with SCnP alone. When broadening of the soret bands is focused on, broadening of SC0P coordinated much closer to the surface of the gold nanoparticle is much more significant. However, as shown in FIGS. 17 and 18, strength of the pi junction of these gold nanoparticles is insufficient and steric hindrance is caused because four substituting phenyl groups at meso positions twist with respect to the porphyrin ring such that particles cannot get sufficiently close with each other, thereby not expressing the electrical conductivity.

COMPARATIVE EXAMPLE 2

Figure 19:
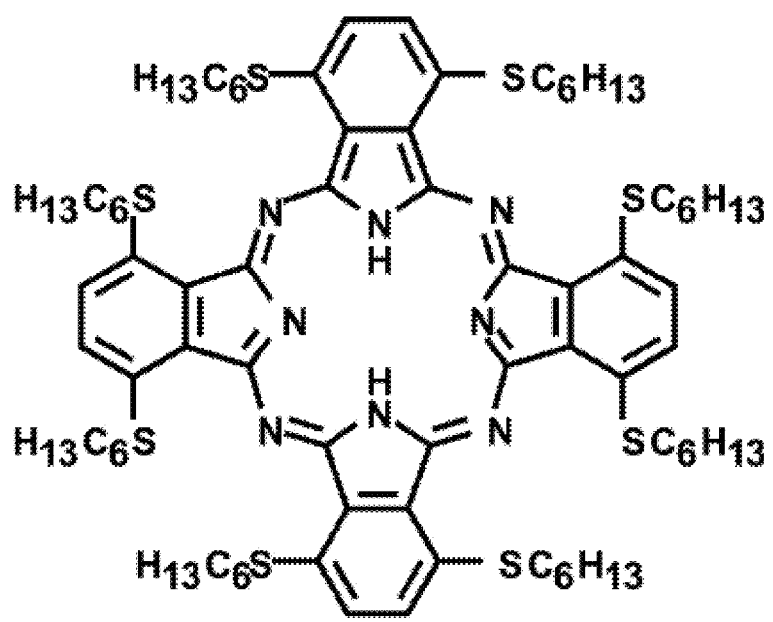
FIG. 19 is a chemical structure diagram of SPc.
Figure 20:
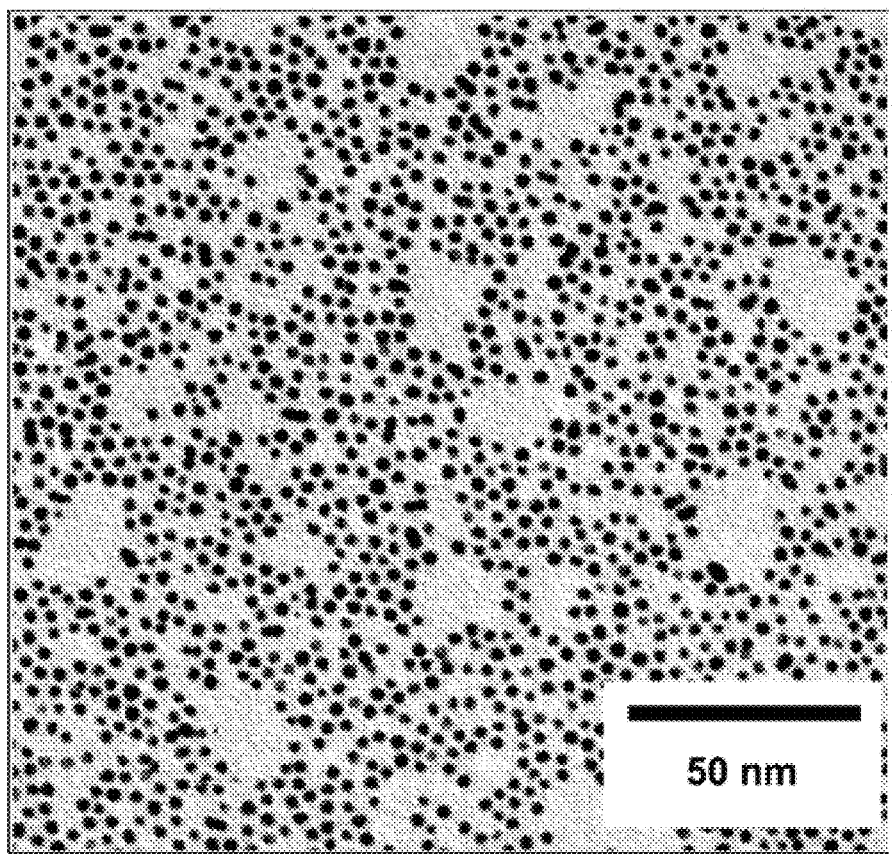
FIG. 20 shows a TEM image of SPc protecting gold nanoparticles.

Much closer coordination to the surface of the nanoparticle was at first expected and phthalocyanine derivative SPc protecting gold nanoparticles having a chemical structural formula as shown in FIG. 19 were prepared and investigated. A TEM image picture is shown in FIG. 20.

Figure 21:
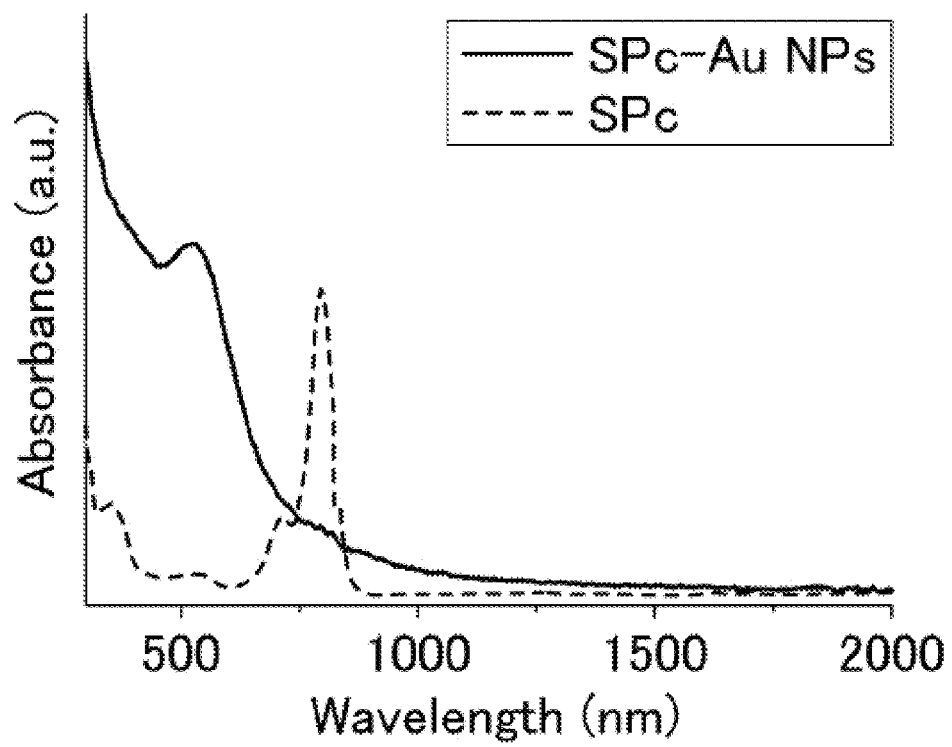
FIG. 21 shows UV-vis spectra of SPc and SPc protecting gold nanoparticles.

With respect to the phthalocyanine derivative SPc protecting gold nanoparticles (particle diameter: 3 nm), as shown in FIG. 21, Q band near 750 nm which is characteristic to phthalocyanine almost disappeared. This is a result indicating a strong pi junction. However, since SPc has eight hexyl groups at alpha positions, which has a structure with arms extending outward from a particle when the hexyl groups coordinate to the nanoparticle because of steric hindrance of each other as a feature of side chains at alpha positions, as a result, it has been found that the electrical conductivity is not expressed with the SPc protecting gold nanoparticle (Two positions closer to the phthalocyanine base structure are referred to as alpha positions and two other positions farther from it are referred to as beta positions.).

As mentioned above, it has been explained with examples of the present invention, but the technical scope of the present invention is not limited to that of descriptions of the aforementioned examples. The aforementioned examples can be subject to various kinds of modifications or improvements. It is clear that such examples to which various kinds of modifications or improvements are added are included in the technical scope of the present invention from the description of the claims. For example, it has been explained with the case where the inorganic nanoparticle is made of gold, but other inorganic nanoparticles can also be applied in the same way.

DESCRIPTION OF NUMERALS 1 inorganic nanoparticle
2 sigma organic ligand
3 organic pi conjugated ligand

What is claimed is:

1. A nanoink composition comprising: an inorganic nanoparticle, an organic pi conjugated ligand, and a solvent, wherein:
   the organic pi conjugated ligand is connected to the inorganic nanoparticle with pi-junction such that a Q band of the organic pi conjugated ligand disappears; and
   the organic pi conjugated ligand is 2, 3, 9, 10, 16, 17, 23, 24-octakis [(2-N, N-dimethylamino ethyl) thio] phthalocyanine (OTAP) or 2, 3, 11, 12, 20, 21, 29, 30-octakis [(2N, N-dimethylamino ethyl) thio] naphthalocyanine (OTAN).

2. The nanoink composition according to claim 1, wherein the solvent is water or a solvent mixed with water, or alcohol or a solvent mixed with alcohol.

3. The nanoink composition according to claim 1, wherein the inorganic nanoparticle comprises one metal, a mixture of two or more metals, or an alloy with two or more metals, each metal selected from a group consisting of gold, silver, copper, platinum, palladium, nickel, ruthenium, indium, and rhodium.

4. The nanoink composition-according to claim 1, wherein the inorganic nanoparticle is either a semiconductor particle or electro-conductive oxide particle.

5. The nanoink composition comprising: an inorganice nanoparticle, an organic pi conjugated ligand, and a solvent, wherein:
   the organic pi conjugated ligand is connected to the inorganic nanoparticle with pi-junction such that a Q band of the pi conjugated ligand disappears and
   the organic pi conjugated ligand is 2, 3, 9, 10, 16, 17, 23, 24-octakis [(2-N, N-dimethylamino ethyl) thio] phthalocyanine (OTAP).

6. A nanoink composition comprising: an inorganic nanoparticle, an organic pi conjugated ligand, and a solvent, wherein:
   the organic pi conjugated ligand is connected to the inorganic nanoparticle with pi-junction such that a Q band of the pi conjugated ligand disappears and
   the organic pi conjugated ligand is 2, 3, 11, 12, 20, 21, 29, 30-octakis [(2-N, N-dimethylamino ethyl) thio] naphthalocyanine (OTAN).

* * * * *